(12) United States Patent
Klett

(10) Patent No.: US 6,344,159 B1
(45) Date of Patent: Feb. 5, 2002

(54) METHOD FOR EXTRUDING PITCH BASED FOAM

(75) Inventor: James W. Klett, Knoxville, TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/400,678

(22) Filed: Sep. 21, 1999

(51) Int. Cl.⁷ .............................................. B29C 44/20
(52) U.S. Cl. ...................... 264/29.7; 264/29.1; 264/42; 264/54; 264/69
(58) Field of Search ............... 264/29.1, 29.7, 264/42, 41, 69, 54

(56) References Cited

U.S. PATENT DOCUMENTS

| | | | |
|---|---|---|---|
| 3,194,855 A | * 7/1965 | Jones et al. | 264/29.1 |
| 3,219,731 A | * 11/1965 | Etzel et al. | 264/29.1 |
| 3,254,143 A | * 5/1966 | Heitman | 264/29.7 |
| 3,268,633 A | * 8/1966 | Jansen | 264/29.1 |
| 3,642,962 A | * 2/1972 | Wallouch | 264/29.7 |
| 3,814,566 A | * 6/1974 | Stroup | 264/29.1 |
| 4,276,246 A | 6/1981 | Bonzom et al. | |
| 5,738,935 A | 4/1998 | Turk et al. | |
| 5,770,127 A | * 6/1998 | Abrams et al. | 264/29.7 |
| 5,868,974 A | * 2/1999 | Kearns | 264/42 |
| 6,077,464 A | * 6/2000 | Murdie et al. | 264/29.5 |

FOREIGN PATENT DOCUMENTS

| | | |
|---|---|---|
| DE | 36 24 909 A | 1/1987 |
| GB | 2 163 143 A | 2/1986 |
| WO | WO 99 11585 A | 3/1999 |

OTHER PUBLICATIONS

Abstract, Database WPI Week 197046, Derwent Publications, Ltd., London (XP–002158316) (Undated).

* cited by examiner

*Primary Examiner*—Allan R. Kuhns
(74) *Attorney, Agent, or Firm*—Akerman Senterfitt & Eidson, P.A.

(57) ABSTRACT

A method and apparatus for extruding pitch based foam is disclosed. The method includes the steps of: forming a viscous pitch foam; passing the precursor through an extrusion tube; and subjecting the precursor in said extrusion tube to a temperature gradient which varies along the length of the extrusion tube to form an extruded carbon foam. The apparatus includes an extrusion tube having a passageway communicatively connected to a chamber in which a viscous pitch foam formed in the chamber paring through the extrusion tube, and a heating mechanism in thermal communication with the tube for heating the viscous pitch foam along the length of the tube in accordance with a predetermined temperature gradient.

10 Claims, 5 Drawing Sheets

Typical TGA of ARA Mesophase Pitch

METHOD FOR EXTRUDING PITCH BASED FOAM

STATEMENT REGARDING FEDERALLY SPONSORED RESEARCH OR DEVELOPMENT

The United States Government has rights in this invention pursuant to contract No. DE-AC05-96OR22464 between the United States Department of Energy and Lockheed Martin Energy Research Corporation.

CROSS REFERENCE TO RELATED APPLICATIONS

Not Applicable

BACKGROUND OF THE INVENTION

The present invention relates to carbon foam, and more particularly to a process and apparatus for extruding a thermally conductive carbon foam.

The extraordinary mechanical properties of commercial carbon fibers are due to the unique graphitic morphology of the extruded filaments. See Edie, D. D., "Pitch and Mesophase Fibers," in Carbon Fibers, Filaments and Composites, Fiqueiredo (editor), Kluwer Academic Publishers, Boston, pp. 43–72 (1990). contemporary advanced structural composites exploit these properties by creating a disconnected network of graphitic filaments held together by an appropriate matrix. Carbon foam derived from a pitch precursor can be considered to be an interconnected network of ligaments or struts. As such interconnected networks, they would represent a potential alternative as a reinforcement in structural composite materials.

Recent developments of fiber-reinforced composites has been driven by requirements for improved strength, stiffness, creep resistance, and toughness in structural engineering materials. Carbon fibers have led to significant advancements in these properties in composites of various polymeric, metal, and ceramic matrices.

However, current applications of carbon fibers has evolved from structural reinforcement to thermal management in application ranging from high density electronic modules to communication satellites. This has stimulated research into novel reinforcements and composite processing methods. High thermal conductivity, low weight, and low coefficient of thermal expansion are the primary concerns in thermal management applications. See Shih, Wei, "Development of Carbon-Carbon composites for Electronic Thermal Management Applications," IDA Workshop, May 3–5, 1994, supported by AF Wright Laboratory under Contract Number F33615-93-C-2363 and AR Phillips Laboratory Contract Number F29601-93-C-0165 and Engle, G. B., "High Thermal Conductivity C/C composites for Thermal Management," IDA Workshop, May 3–5, 1994, supported by AF Wright Laboratory under Contract F33615-93C-2363 and AR Phillips Laboratory Contract Number F29601-93-C-0165. Such applications are striving towards a sandwich type approach in which a low density structural core material (i.e. honeycomb or foam) is sandwiched between a high thermal conductivity facesheet.

Structural cores are limited to low density materials to ensure that the weight limits are not exceeded. Unfortunately, carbon foams and carbon honeycomb materials are the only available materials for use in high temperature applications (>1600° C.). High thermal conductivity carbon honeycomb materials are extremely expensive to manufacture compared to low conductivity honeycombs, therefore, a performance penalty is paid for low cost materials Typical foaming processes utilize a "blowing" technique to produce a foam of the pitch precurgor. The pitch is melted and pressurized, and then the pressure is reduced. Thermodynamically, this produces a "Flash," thereby causing the low molecular weight compounds in the pitch to vaporize (the pitch boils), resulting in a pitch foam. See Hagar, Joseph W. and Max L. Lake, "Novel Hybrid Composites Based on Carbon Foams," Mat. Res. Soc. Symp., Materials Research Society, 270:29–34 (1992), Hagar, Joseph W. and Max L. Lake, "Formulation of a Mathematical Process Model Process Model for the Foaming of a Mesophase Carbon Precursor," Mat. Res. Soc. Symp., Materials Research Society, 270:35–40 (1992), Gibson, L. J. and M. F. Ashby, Cellular Solids: Structures & Properties, Pergamon Press, New York (1998), Gibgon, L. J., Mat. Sci. and Eng A110, 1 (1989), Knippenberg and B. Lersmacher, Phillips Tech. Rev., 36(4), (1976), and Bonzom, A., P. Crepaux and E. J. Moutard, U.S. Pat. No. 4,276,246, (1981). Additives can be added to promote, or catalyze, the foaming, such as dissolved gases (like carbon dioxide, or nitrogen), talc powder, freons, or other standard blowing agents used in making polymer foams.

Then, unlike polymer foams, the pitch foam must be oxidatively stabilized by heating in air (or oxygen) for many hours, thereby, cross-linking the structure and "setting" the pitch so it does not melt, and deform the structure, during carbonization. See Hagar, Joseph W. and Max L. Lake, "Formulation of a Mathematical Process Model Process Model for the Foaming of a Mesophase Carbon Precursor, Mat. Res. Soc. Symp., Materials Research Society, 270:35–40 (1992) and White, J. L., and P. M. Shaeffer, Carbon, 27:697 (1989). This is a time consuming step and can be an expensive step depending on the part size and equipment required.

Next, the "set" or oxidized pitch foam is then carbonized in an inert atmosphere to temperatures as high as 1100° C. Then, a final heat treatment can be performed at temperatures as high as 3000° C. to fully convert the structure to carbon and produce a carbon foam suitable for structural reinforcement. However, these foams as just described exhibit low thermal conductivities.

Other techniques may utilize a polymeric precursor, such as phenolic, urethane, or blends of these with pitch. See Hagar, Joseph W. and Max L. Lake, "Idealized Strut Geometries for Open-Celled Foams," Mat. Res. Soc. Symp., Materials Research Society, 270:41–46 (1992), Aubert, J. W., (MRS Symposium Proceedings, 207:117–127 (1990), Cowlard, F. C. and J. C. Lewis, J. of Mat. Sci., 2:507–512 (1367) and Noda, T., Inagaki and S. Yamada, J. of Non-Crystalline Solids, 1:285–302, (1969). However, these precursors produce a "glassy" or vitreous carbon which does not exhibit graphitic structure and, thus, has a very low thermal conductivity and low stiffness as well. See Hagar, Joseph W. and Max L. Lake, "Idealized Strut Geometries for Open-Celled Foams," Mat. Res. Soc. Symp., Materials Research Society, 270:41–46 (1992).

One technique developed by the inventor of the present invention, and is fully disclosed in commonly assigned U.S. patent application Ser. No. 08/921,875. It overcomes these limitations, by not requiring a "blowing" or "pressure release" technique to produce the foam. Furthermore, an oxidation stabilization step is not required, as in other methods used to produce pitch-based carbon. This process is less time consuming, and therefore, will be lower in cost and easier to fabricate than the prior art above. More importantly, this process is unique in that it produces carbon foams with high thermal conductivities, greater than 58 W/m·K.

However, the method described in U.S. patent application Ser. No. 08/921,875 is a batch process. This prevents large scale production at reasonable costs. Therefore, it is desirable to provide a continuous process that will produce carbon foam, so as to reduce costs and increase throughput.

SUMMARY OF THE INVENTION

The present invention provides a method of extruding a pitch or mesophase (herein after called pitch) based foam. The method includes the steps of: forming a viscous pitch foam; passing the viscous pitch foam through an extrusion tube; and subjecting the viscous pitch foam in the extrusion tube to a temperature gradient which varies along the length of the extrusion tube to form an extruded pitch derived foam, carbon foam, or graphitic foam, depending on the maximum temperature during the extrusion cycle.

A general objective of the present invention is to provide an extrusion method which can be continuous. This objective is accomplished by passing a viscous pitch foam through an extrusion tube and coking (solidifying) the viscous pitch foam as it passes through the tube.

Another objective of the present invention is to extrude carbon foam having specific properties. This objective is accomplished by heat treating the pitch derived foam in the extrusion tube to form carbon foam having specific properties, such as a carbonized or graphitized carbon foam.

Another aspect of the present invention provides an apparatus for extruding carbon foam. The apparatus includes a melting chamber for melting pitch, a foaming chamber communicatively connected to the melting chamber for foaming the melted pitch to form a viscous pitch foam, and a heated extrusion tube having a passageway communicatively connected to the foaming chamber, wherein the viscous pitch foam formed in the foaming chamber passes through said extrusion tube passageway to form an extruded pitch based foam of virtually any extrudable shape.

These and other objectives are accomplished by a method of extruding a pitch based foam which includes the steps of: forming a viscous pitch foam in a container; transferring the precursor from the container into an extrusion tube; and hardening the extruded pitch based foam.

DETAILED DESCRIPTION OF THE INVENTION

A pitch based foam, such as fully disclosed in U.S. patent application Ser. Nos. 08/921,875, and 08/923,877 which are commonly owned by the assignee of the present application, and which teachings are fully incorporated herein by reference, is formed by first extruding a viscous pitch foam, such as derived from a mesophase or isotropic pitch, through an extrusion tube. The viscous pitch foam can be heat treated in the tube to form an extruded carbon foam having desirable properties, The extrusion process can be continuous to provide continuous production of the carbon foam or a batch process. If the extrusion is only a pitch derived foam, then it can be heat treated in a separate furnace to produce a carbon or graphitic foam.

Whether the foam is pitch derived, carbon, or graphitic depends upon the heat treatment of the foam. If the maximum temperature of the extrusion is less than 800° C. then the molecular structure of the material still contains non-carbon atoms, and therefore is considered a pitch derived foam. If the maximum temperature of the extrusion is between 800° C. and about 2000° C., then the molecular structure of the material contains only carbon atoms, and therefore is considered a pitch derived carbon foam. If the maximum temperature is greater than 2000° C., then the material is beginning to show signs of graphitic structure (depending on original pitch precursor) and therefore is considered a pitch derived graphitic foam. The foam, whether viscous, pitch derived, carbon, or graphitic is generically referred to in this application as pitch based.

Figure 1:
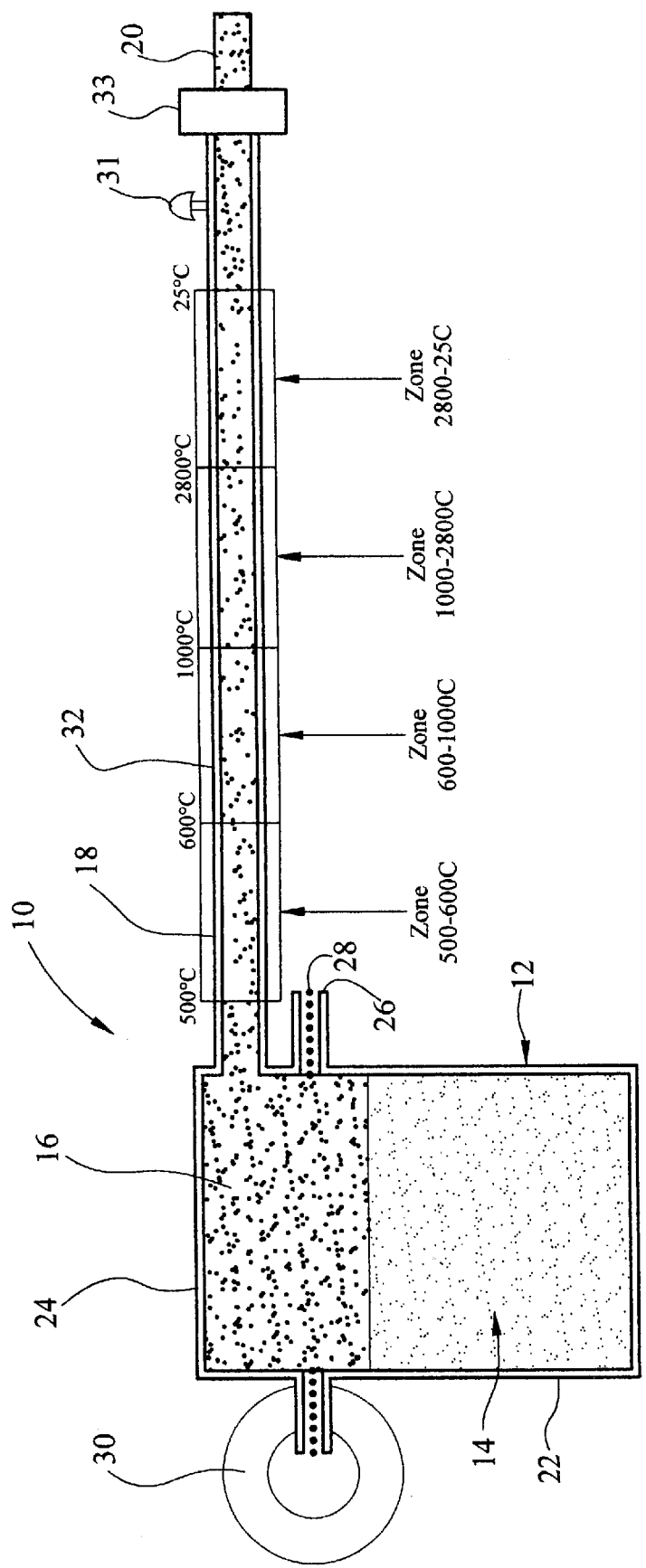
FIG. 1 is a batch apparatus for extruding carbon foam which incorporates the present invention.

As shown in FIG. 1, an apparatus 10 for extruding carbon foam in a batch process includes a melting/foaming chamber 12 for melting pitch materials 14, and foaming the meltel pitch materials 14 to form a vignnug Pitch foam 16. The melting/foaming chamber 12 is a heatable container, such as a crucible, which can withstand internal pressures exerted on container walls by the expanding viscous pitch foam 16. The viscous pitch foam 16 expands in the chamber 12 and forces its way into an extrusion tube 18 communicatively connected to the chamber 12. The extrusion tube 18 heats the extruded foamed pitch precursor 16 in accordance with a predetermined temperature gradient along the tube length to coke the viscous pitch foam 16, and heat treat the hardened foam 20. As discussed above, the properties of the extruded foam will depend on the maximum temperature of the heat treatment in the extrusion tube 18.

The melting/foaming chamber 12 is a crucible 22 with a lid 24. Pitch 14 is placed in the crucible 22, and the lid 24 is secured to the crucible top 26. Grafoil gasket material 28 is clamped between the lid 24 and crucible 22 using graphite clamps 30 to provide a tight seal.

The heated extrusion tube 18 extends from the lid 24, and has a shaped inner passageway 32 through which the extruded materials pass. The passageway 32 is shaped to form a desired extruded material cross section shape. Alternatively, the viscous pitch foam can pass through an orifice disposed in the passageway 32 to form the desired extruded material cross section.

The extrusion tube 18 is heated to provide a predetermined temperature gradient along the tube length. The temperature gradient along the length of the tube determines the characteristics of the extruded carbon foam 20. The tube 18 is heated using conventional heating methods known in the art, such as by using radiant energy, in the form of IR lamps, microwave energy, induction heating, band heaters, and the like.

When the viscous pitch foam 16 expands, it forces its way out of the clamber 12 through the extrugion tube 22. A throttle valve 31 disposed in the extrusion tube throttles the flow of extruded material to maintain the desired pressure in the foaming chamber 12, and control the flow of extruded material.

Once the extruded carbon foam 20 passes through the extrusion tube 18, a sectioning device 33 disposed downstream of the tube 18 cuts the extruded foam 20 to desired section lengths. The sectioning device 33 can be any suitable cutting devices, such a saw, shear, and the like.

In use, the pitch 14, in the form of pitch powder, granules, pellets, or the like, are placed in the chamber 12. The pitch 14 can be solvated if desired. The pitch 14 is heated in a substantially oxygen-free environment to avoid oxidation of the pitch materials 14 during heating. Preferably, the pitch 14 is heated by placing band heaters around the chamber 12 to a temperature approximately 50 to 100° C. above its softening point. For example, where Mitsubishi ARA24 mesophase pitch is used, a temperature of 300° C. is sufficient. The chamber is pressurized initially with a nitrogen purge (or other inert gas) to the desired pressure of foaming and the throttle valve is used to regulate the pressure during foaming.

Figure 2:
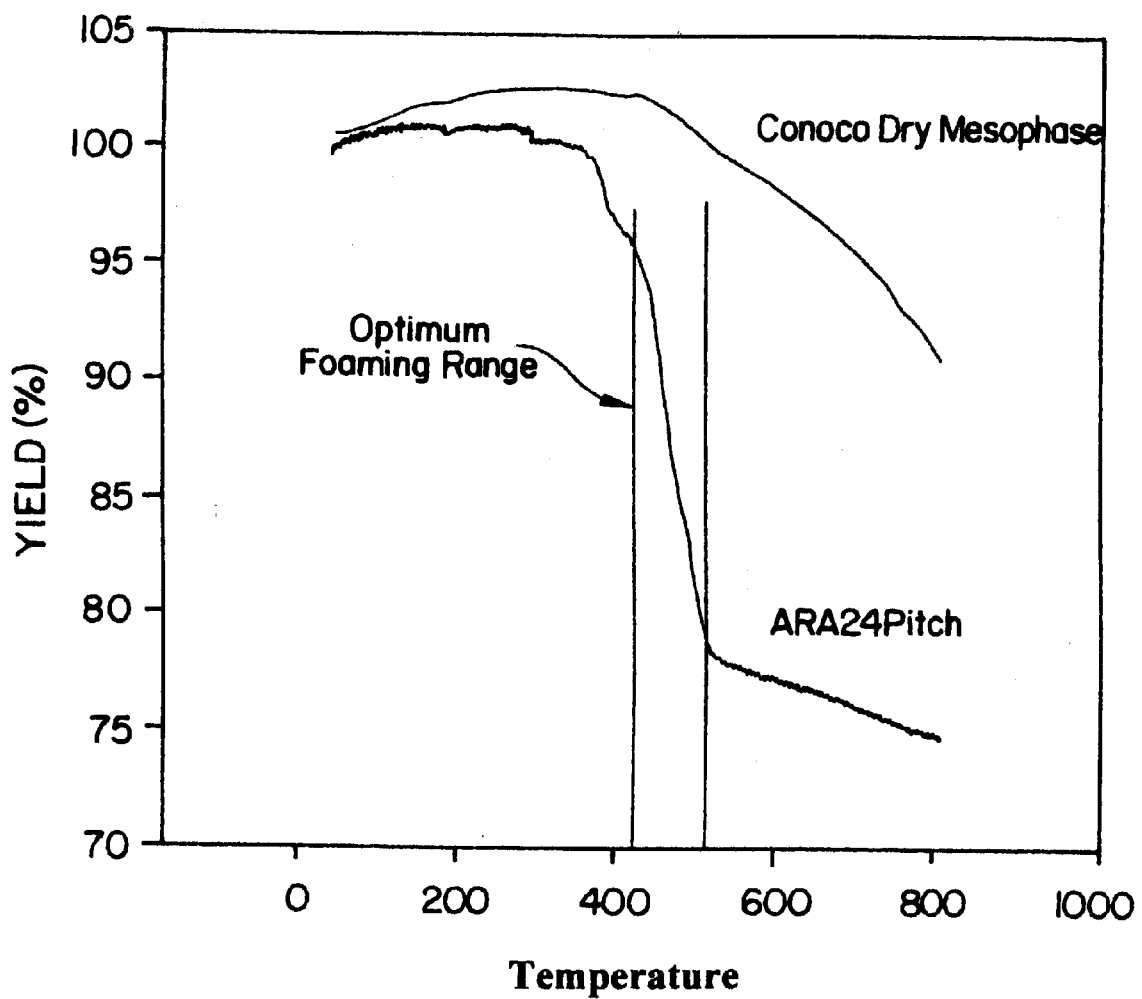
FIG. 2 is a graph showing an optimum foaming temperature range for ARA24 mesophanse pitch.

Preferably, the pressure inside the chamber 12 is then increased up to 1000 psi. The temperature of the pitch 14 is then raised to cause the evolution of pyrolysis gases in the pitch 14. The pyrolysis gases foams the melted pitch 14 to form the viocoua pitch foam 16 which expands into the extrusion tube 18. Preferably, the temperature of the pitch 14 is increased to an optimum foaming temperature range for the particular molten pitch in the melting/foaming chamber 12. An optimum foaming temperature is a temperature in which the foam yield is maximized. For example, as shown in FIG. 2, a preferred foaming temperature range for ARA24 mesophase pitch is between 420C and 520C. Most preferably, the foaming temperature range is between 420C and 450C.

The expanding viscous pitch foam 16 passes through the throttle valve and into the extrusion tube 18 which shapes and heat treats the extruded material to form the carbon foam. The extrusion tube 18 is heated in order to subject the extruded material to a temperature gradient, such as disclosed in FIG. 3, which forms carbonized and graphitized carbon foam 20.

Figure 3:
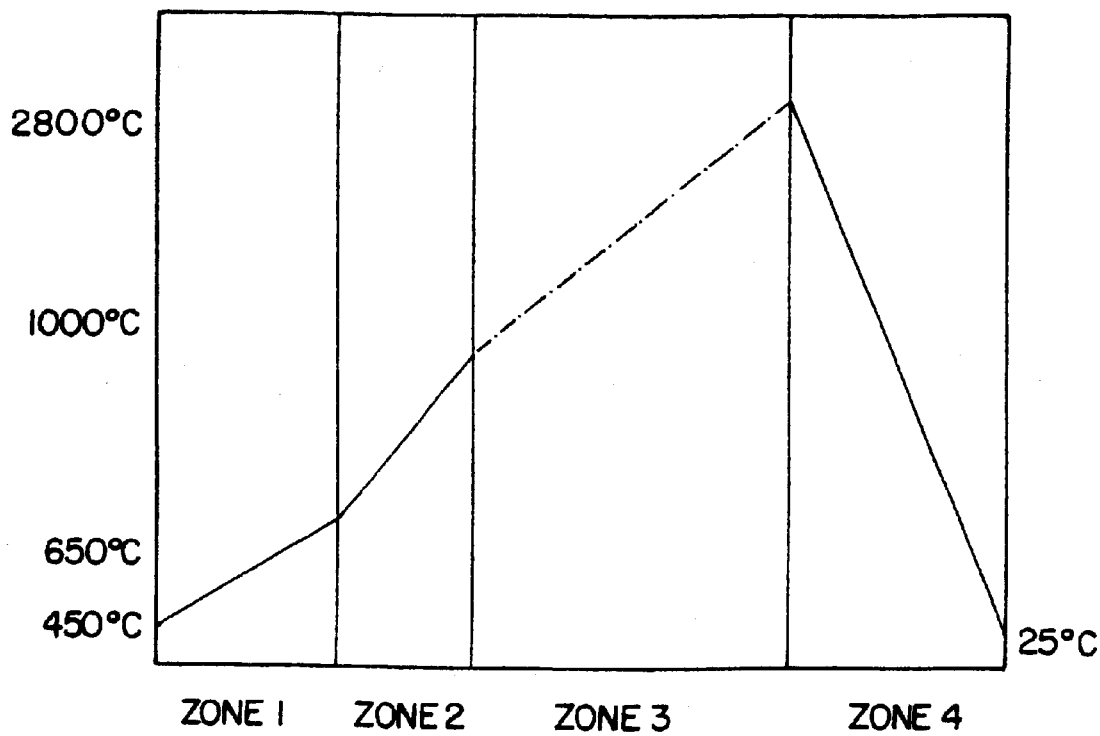
FIG. 3 is a temperature gradient suitable for use with the apparatus of FIG. 1.

As shown in FIG. 3, the extruded viscous pitch foam 16 is heated in a first zone to coke (harden) the extruded viscous pitch and form the pitch derived foam 20. For example, the temperature of a viscous pitch foam derived from ARA mesophase pitch is preferably increased along the length of the tube to about 500C–1000C The pitch derived foam 20 can be exposed to additional temperature gradientg in the extrusion tube 18 to produce carbon foam or graphitized foam. For example, prior to cooling the pitch derived foam 20, the temperature Of the foam 20 can be further increased to carbonize or graphitize the foam. As gliwn in FIG. 3, the pitch derived foam 20 is further heated in a second zone to further increase the foam temperature to carbonize the foam 20. Vollowing carbonizing, the extruded material is heated in a third zone to approximately 2800C to further increase the carbon foam temperature causing it to graphitize, depending on the pitch precursor. Preferably, the graphitizing zone includes a period of constant peak temperature to ensure the carbon foam is substantially isothermal.

Finally, the graphitized carbon foam 20 is cooled in a fourth zone below 200C in order to allow handling of the extruded material, such as conveying or sectioning the extruded carbon foam 20. Preferably, the temperature along the length of the tube 18 in the fourth zone is gradually decreased to a temperature at which the carbon foam does not oxidize.

It will thus be seen that the present invention provides for the production of an extruded pitch-based foam. The process involves the fabrication of a foam from a mesophase or isotropic pitch which can be synthetic, petroleum, or coal-tar based. A blend of these pitches can also be employed. The foam is formed by melting the pitch in a melting chamber and then foaming the melted pitch in a foaming chamber (which may be the same as the melting chamber) to form a viscous pitch foam. The viscous pitch foam is extruded through an extrusion tube which heat treats the precursor to provide a pitch derived foam or pitch derived carbon foam, depending on maximum temperature.

Preferably, the foam can have a relatively uniform distribution of pore sizes (average between 50 and 500 microns), very little closed porosity, and a density ranging from approximately 0.20 g/cm$^3$ to 0.7 g/cm$^3$. However, deviations from this preferable properties are possible by changing the operating conditions and the pitch precursor. When a mesophase pitch is used, the domains are stretched along the struts (or cell walls) of the foam structure and thereby produces a highly aligned graphitic structure parallel to the cell walls (or struts). When graphitized, these struts will exhibit thermal conductivities similar to the very expensive high performance carbon fibers (such as P-120 and K1100). Thus, the foam will exhibit high thermal conductivity at a very low density (≈0.5 g/cc). By utilizing an Isotropic pitch, the resulting foam can be easily activated to produce a high surface area activated carbon. Also, isotropic pitches will typically results in stronger materials, especially if derived from coals.

Figure 4:
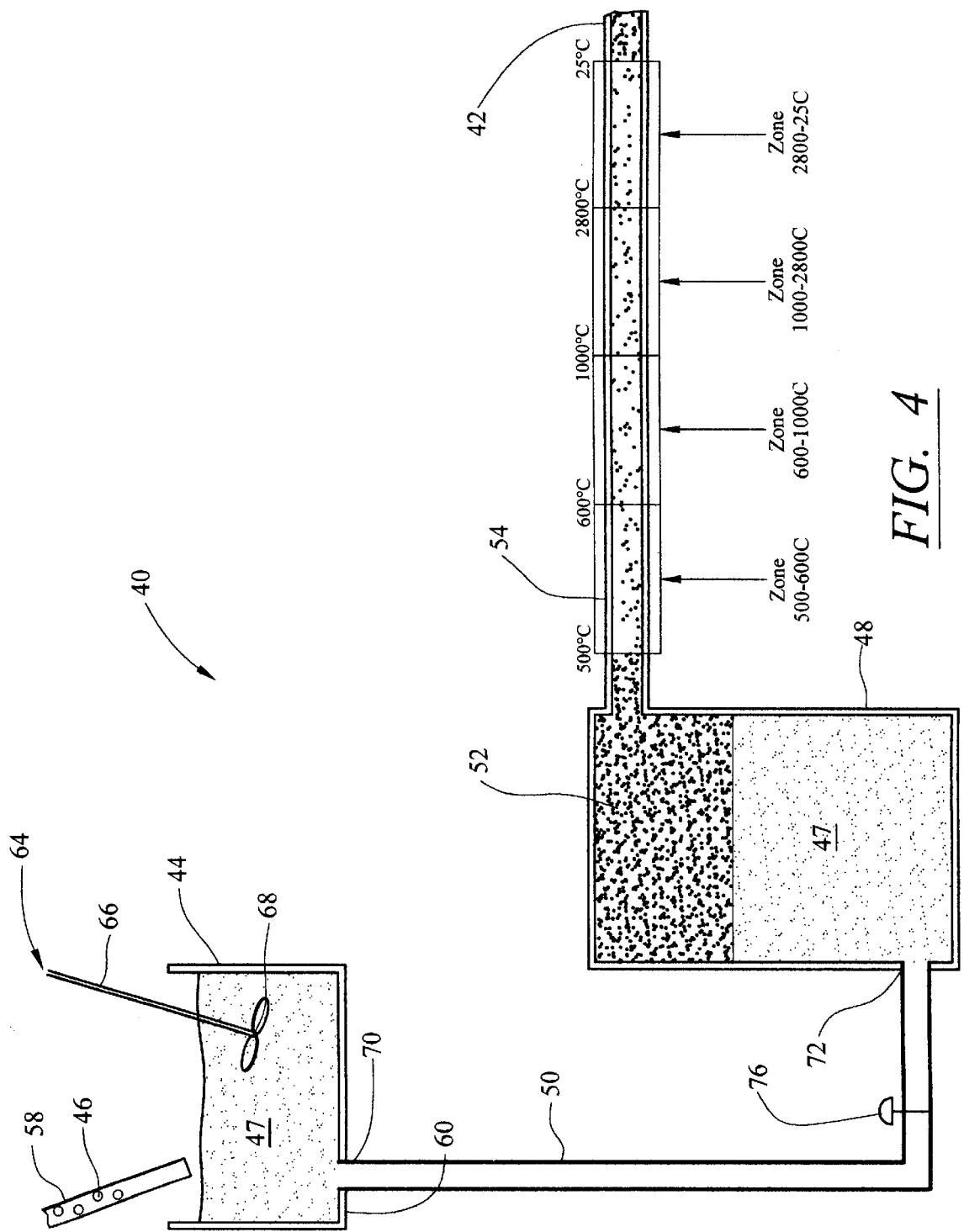
FIG.4 is a continuous carbon foam extruding apparatus incorporating the present invention.

The carbon foam can also be continuously extruded using an apparatus incorporating the present invention. This is very similar to the previously described apparatus with the addition of a separate melting chamber and device to continuously add molten pitch to the foaming chamber. As shown in FIG. 4, an apparatus 40 for continuously extruding carbon foam 42 includes a melting chamber 44 for melting pitch materials 46, and a foaming chamber 48. The foaming chamber 48 is communicatively connected to the melting chamber 44 by a passageway 50 for foaming the melted pitch materials 47 to form a viscous pitch foam 52. A pump, not shown, between the melting chamber and the foaming chamber will regulate the flow of molten pitch into the pressurized foaming chamber. The viscous pitch foam produced in the foaming chamber expands into an extrusion tube 54 communicatively connected to the foaming chamber 48. The extrusion tube 54 heats viscous pitch foam 52 in accordance with a predetermined temperature gradient along the tube length to coke the viscous pitch foam 52, and shape the foam 42. Preferably, the extrusion tube 54 also heat treats the carbon foam 42 to provide a carbon or graphitic foam with specific properties.

The melting chamber 44 is a heatable container having a feed tube 58 which feeds solid pitch 46 into the chamber 44. The feed tube 58 continuously feeds pitch powder, granules, pellets, or the like into the melting chamber 44 which is heated to transform the solid pitch 46 into molten pitch 47. The pitch 46 is heated in the melting chamber 44 in an oxygen free environment, such as nitrogen, and exits the chamber 44 through an outlet 60 formed in a melting chamber wall into the passageway 50. Preferably, the pitch is heated to about 100C above the pitch softening point to provide a flowable molten pitch 47. For example, an ARA24 mesophase pitch is preferably heated to about 350C.

Preferably, an agitating mechanism 94 agitates the molten pitch 47 in the melting chamber 44 to ensure uniform pitch temperature and homogeneity. The agitating mechanism 64 includes a rotatable mixing shaft 66 having a mixing end 68 disposed in the molten pitch 47. The mixing end 68 rotates to agitate the molten pitch 47. Although a rotating mixing shaft 46 is disclosed, other methods known in the art can be used to agitate the molten pitch 47, such as rotating the melting chamber, vibrating paddles in the molten pitch, and the like.

The molten pitch 47 passes through the passageway 50 to the foaming chamber 48. The passageway 50 has an inlet 70 which receives the molten pitch 47 from the melting chamber 44, and an outlet 72 through which the molten pitch 47 enters the bottom 74 of the foaming chamber 48. In one embodiment, the melting chamber 44 is disposed above the foaming chamber 48 to gravity feed the molten pitch 47 into the foaming chamber 48. A valve 76 or meter pump disposed in the passageway 50 can regulate the flow of molten pitch into the foaming chamber 48 to maintain a pressure therein.

The foaming chamber 48 is a pressurized heatable container which heats the molten pitch 47 under pressure to cause the evolution of pyrolysis gases to form the foam precursor 52. As in the melting chamber 44, the molten pitch is heated in an oxygen free environment to avoid oxidation of the molten pitch 47.

The molten pitch 47 enters the foaming chamber 48 through the passageway outlet 72, and is heated in the foaming chamber to a temperature sufficient to cause the molten pitch 47 to foam at the foaming chamber pressure to form the foam precursor 52. For example, at a pressure of approximately 68 atm (1000 psi), ARA24 mesophase pitch will foam at a temperature between approximately 420C and 480C. Preferably, the temperature in the foaming chamber is maintained at approximately 450C under a pressure between approximately 27 atm and 68 atm (400 psi and 1000 psi) when foaming molten ARA24 mesophase pitch.

The viscous pitch foam 52 expands in the foaming chamber 48, forcing its way through the extrusion tube 54. As in the first embodiment, a throttle valve (not shown) disposed in the extrusion tube 54 throttles the flow of extruded materials to maintain the desired pressure in the foaming chamber 48, and control the flow of extruded materials.

The expanding viscous pitch foam 52 passes through the extrusion tube 54 which shapes and heat treats the extruded material to form the pitch derived foam 42. The extrusion tube 54 subjects the extruded material to a temperature gradient, such as disclosed in FIG. 3, which forms carbonized and graphitized carbon foam 42.

As in the first embodiment, the extrusion tube 54 is heated to provide a predetermined temperature gradient along the tube length such as disclosed above in FIG. 3. The temperature gradient along the length of the tube 54 determines the characteristics of the extruded foam 42. The tube 54 is heated using conventional heating methods known in the art, such as by using radiant energy, in the form of IR lamps, microwave energy, induction heating, and the like.

Figure 5:
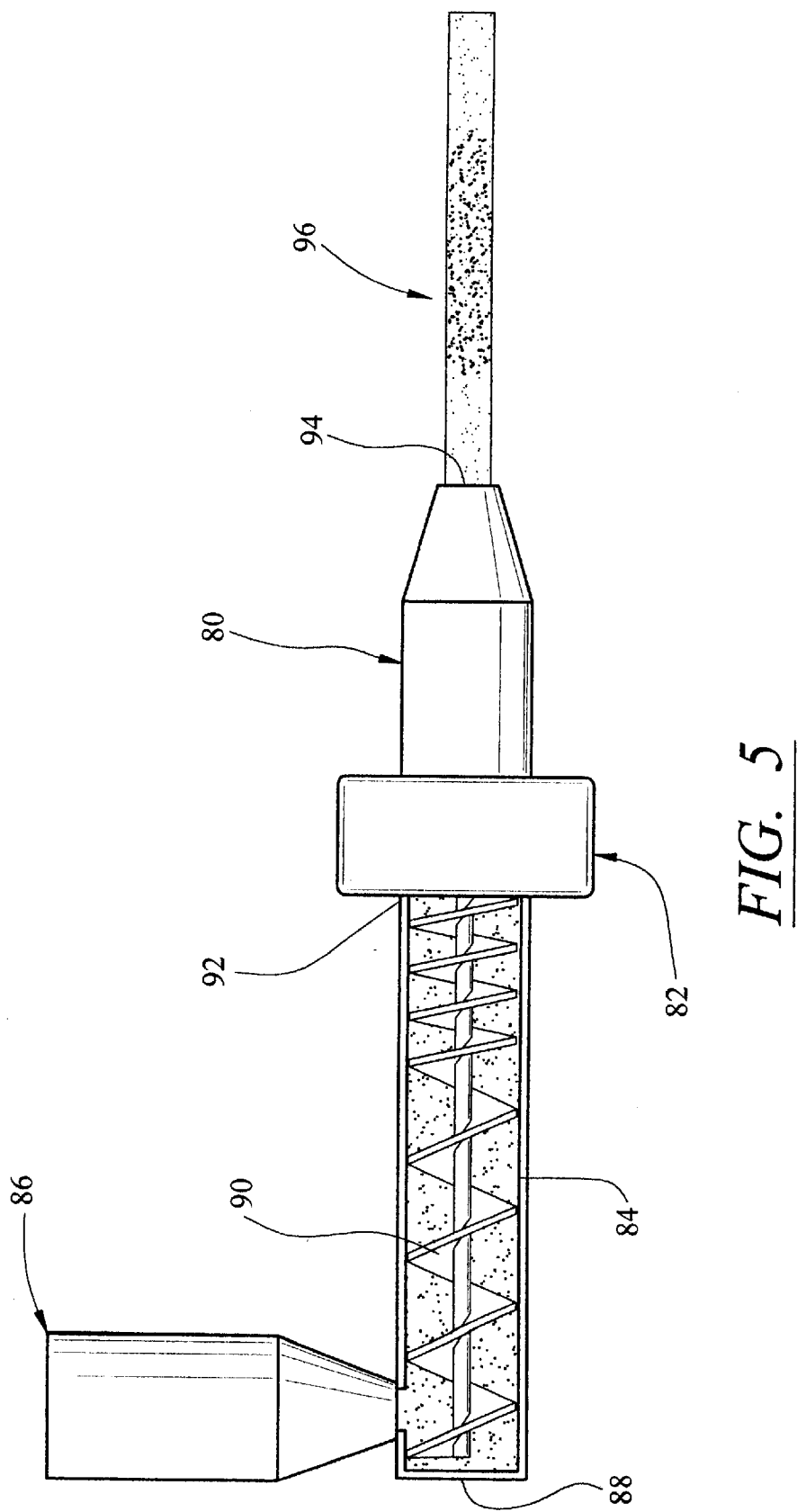
FIG. 5, in another embodiment of a continuous carbon foam extruding apparatus incorporating the present invention

In another embodiment of the present invention, shown in FIG. 5, molten pitch ig continuously fed into a foaming chamber 80 by a metering pump 82 interposed between the foaming chamber 80 and a melting chamber 84. Pitch is continuously supplied to the melting chamber 84 by a hopper 86 mounted proximal to a feed end 88 of the cylindrical melting chamber 84. The heated melting chamber 84 melts the pitch and, and a feed screw 90 disposed in the melting chamber urges the melted paint toward the metering pump 82 disposed at the melting chamber pump end 92. Advantageously, the feed screw 90 mixes the pitch to ensure uniform temperature and homogeneity of the melted pitch. Exposure of the pitch to oxygen is minimized to avoid oxidation by methods known in the art, such as by evacuating the melting chamber 84, maintaining an inert gas blanket in the melting chamber 84, and the like.

The metering pump 82 disposed at the melting chamber pump end 92 pumps the molten pitch into the pressurized foaming chamber 80. The foaming chamber 80 foams the molten pitch to form a viscous pitch foam by heating the molten pitch under pressure to cause the formation of pyrolysis gases. The pitch is foamed in an oxygen free environment, such as in the presence of an inert gas, to avoid oxidation. The expanding viscous pitch foam forces its way through an opening 94 in the foaming chamber 80, and into an extrusion tube 96. A modified standard screw feed melt extruder would be suitable for this task.

As disclosed in the first embodiment, the extrusion 96 tube subjects the extruded viscous pitch foam, and resulting carbon foam to a predetermined temperature gradient. The predetermined temperature gradient cokes and heat treats the extruded material to form carbon foam having particular qualities, such as dignloged in the first embodiment. Although not shown, valves controlling the extrusion process, and a cutting mechanism can be provided as in the first embodiment.

While there has been shown and described a preferred embodiment of the invention, it will be obvious to those skilled in the art that various changes and modifications can be made therein without departing from the scope of the invention defined by the appended claims.

What is claimed is:

1. A method of extruding a pitch based foam comprising the steps of:

forming a viscous pitch foam;

passing said viscous pitch foam through an extrusion tube to form an extruded foam; and heating said extruded foam in said extrusion tube in accordance with a predetermined temperature gradient to coke said extruded foam.

2. The method of claim 1, in which said extruded foam is further heated in accordance with said predetermined temperature gradient to form an extruded carbon foam.

3. The method of claim 2, in which said extruded carbon foam is further heated in accordance with said predetermined temperature gradient to form a graphite foam.

4. The method of claim 1, in which the temperature reaches a maximum of between 500 and 650° C.

5. The method of claim 2, in which the temperature reaches a maximum of about 1000° C.

6. The method of claim 3, in which the temperature reaches a maximum of about 2800° C.

7. The method of claims 1, including sectioning said extruded foam.

8. The method of claim 1, in which the step of forming a viscous pitch foam includes the steps of:

melting pitch in a melting chamber to form molten pitch;

transporting said molten pitch to a foaming chamber; and foaming said molten pitch in said foaming chamber to form said viscous pitch foam.

9. The method of claim 8, including agitating said molten pitch in said melting chamber to ensure uniform pitch temperature and homogeneity.

10. The method of claims 8, in which the pitch is selected from the group consisting of: mesophase pitch, isotropic pitch, coal derived pitch, petroleum derived pitch, solvent extracted pitch, and solvated pitch.

* * * * *